(12) United States Patent
Matsukawa et al.

(10) Patent No.: US 9,890,264 B2
(45) Date of Patent: Feb. 13, 2018

(54) METAL OXIDE DISPERSION, POLYMERIZABLE COMPOSITION COMPRISING THE METAL OXIDE DISPERSION, AND POLYMER THEREOF

(71) Applicants: OSAKA MUNICIPAL TECHNICAL RESEARCH INSTITUTE, Osaka (JP); DAIHACHI CHEMICAL INDUSTRY CO., LTD., Osaka (JP)

(72) Inventors: Kimihiro Matsukawa, Osaka (JP); Seiji Watase, Osaka (JP); Manabu Hirata, Osaka (JP)

(73) Assignees: OSAKA RESEARCH INSTITUTE OF INDUSTRIAL SCIENCE AND TECHNOLOGY, Osaka-Fu (JP); DAIHACHI CHEMICAL INDUSTRY CO., LTD., Osaka (JP)

(*) Notice: Subject to any disclaimer, the term of this patent is extended or adjusted under 35 U.S.C. 154(b) by 0 days.

(21) Appl. No.: 14/396,181

(22) PCT Filed: Apr. 24, 2013

(86) PCT No.: PCT/JP2013/062022
§ 371 (c)(1),
(2) Date: Oct. 22, 2014

(87) PCT Pub. No.: WO2013/161859
PCT Pub. Date: Oct. 31, 2013

(65) Prior Publication Data
US 2015/0051344 A1  Feb. 19, 2015

(30) Foreign Application Priority Data

Apr. 27, 2012 (JP) ................................. 2012-103892
Feb. 25, 2013 (JP) ................................. 2013-034305

(51) Int. Cl.
*C08K 3/22* (2006.01)
*C01G 23/053* (2006.01)
(Continued)

(52) U.S. Cl.
CPC ............ *C08K 3/22* (2013.01); *B01F 17/0007* (2013.01); *B01F 17/0064* (2013.01);
(Continued)

(58) Field of Classification Search
CPC ...... C08F 230/02; C08F 292/00; C08L 43/02; C08L 51/10; C08K 3/22; C09D 151/10
See application file for complete search history.

(56) References Cited

U.S. PATENT DOCUMENTS

| 4,581,180 A | 4/1986 | Yokoshima et al. |
| 6,778,753 B2 | 8/2004 | Blomquist |

(Continued)

FOREIGN PATENT DOCUMENTS

| CN | 1476449 | 2/2004 |
| JP | 59-141588 | 8/1984 |

(Continued)

OTHER PUBLICATIONS

International Search Report dated Jul. 23, 2013 in corresponding International (PCT) Application No. PCT/JP2013/062022.
(Continued)

*Primary Examiner* — Michael A Salvitti
(74) *Attorney, Agent, or Firm* — Wenderoth, Lind & Ponack, L.L.P.

(57) ABSTRACT

An objective of the present invention is to provide an organic-inorganic hybrid acrylic polymer having an increased refractive index, which has a higher transparency and a less impaired scratch resistance; a metal oxide dispersion and a polymerizable composition as materials for the
(Continued)

polymer; and the organic-inorganic hybrid polymer capable of being produced in a crack-free manner. Another objective of the present invention is to provide a high-performance antireflection film using the organic-inorganic hybrid polymer. The metal oxide dispersion of the present invention comprises a phosphorus compound represented by Formula (1):

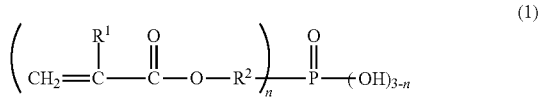

(wherein, $R^1$ is a hydrogen atom, an alkyl group, an alkynyl group, an alkenyl group, an aryl group, an aliphatic heterocyclic group, or an aromatic heterocyclic group; $R^2$ is an organic residue; and n is 1 or 2) and a metal oxide.

9 Claims, 1 Drawing Sheet

(51) Int. Cl.
- C08F 30/02 (2006.01)
- C08F 2/44 (2006.01)
- G02B 1/111 (2015.01)
- C01G 19/02 (2006.01)
- C01G 25/02 (2006.01)
- C01G 27/02 (2006.01)
- C01G 9/02 (2006.01)
- B01F 17/00 (2006.01)
- B82Y 30/00 (2011.01)
- C08F 130/02 (2006.01)
- C08F 230/02 (2006.01)
- C08F 222/10 (2006.01)

(52) U.S. Cl.
CPC .............. *B82Y 30/00* (2013.01); *C01G 9/02* (2013.01); *C01G 19/02* (2013.01); *C01G 23/053* (2013.01); *C01G 25/02* (2013.01); *C01G 27/02* (2013.01); *C08F 2/44* (2013.01); *C08F 30/02* (2013.01); *C08F 130/02* (2013.01); *C08F 230/02* (2013.01); *G02B 1/111* (2013.01); *C01P 2004/61* (2013.01); *C01P 2004/62* (2013.01); *C01P 2004/64* (2013.01); *C08F 222/1006* (2013.01); *C08F 2222/102* (2013.01); *C08F 2222/1026* (2013.01); *C08K 2003/2241* (2013.01)

(56) References Cited

U.S. PATENT DOCUMENTS

| | | | |
|---|---|---|---|
| 2002/0092436 A1 | 7/2002 | Tsuchiya et al. | |
| 2003/0055120 A1 | 3/2003 | Blomquist | |
| 2004/0096777 A1 | 5/2004 | Tsuchiya et al. | |
| 2004/0249081 A1 | 12/2004 | Blomquist | |
| 2007/0155853 A1* | 7/2007 | Chen et al. | 523/109 |
| 2007/0190314 A1 | 8/2007 | Aiki et al. | |
| 2009/0017280 A1* | 1/2009 | Suzuki | B82Y 30/00 428/220 |
| 2009/0022954 A1* | 1/2009 | Kotani | C03C 1/008 428/148 |
| 2009/0035548 A1* | 2/2009 | Aiki et al. | 428/220 |
| 2009/0267033 A1* | 10/2009 | Zhang | C08F 230/02 252/587 |
| 2009/0270541 A1* | 10/2009 | Shinba et al. | 524/423 |
| 2009/0274842 A1* | 11/2009 | Sawada et al. | 427/385.5 |
| 2010/0104842 A1* | 4/2010 | Suzuki et al. | 428/220 |
| 2010/0183689 A1* | 7/2010 | Lim | A61K 8/11 424/401 |
| 2010/0295000 A1* | 11/2010 | Zhang | C08F 290/06 252/582 |
| 2011/0257292 A1* | 10/2011 | Okubayashi et al. | 523/115 |
| 2012/0115108 A1* | 5/2012 | Blomker et al. | 433/217.1 |
| 2015/0051344 A1* | 2/2015 | Matsukawa et al. | 524/853 |

FOREIGN PATENT DOCUMENTS

| | | |
|---|---|---|
| JP | 2002-91016 | 3/2002 |
| JP | 2003-146992 | 5/2003 |
| JP | 2005-161111 | 6/2005 |
| JP | 2007-176806 | 7/2007 |
| JP | 2008-201634 | 9/2008 |
| JP | 2012-25882 | 2/2012 |
| WO | 2008/056639 | 5/2008 |

OTHER PUBLICATIONS

International Preliminary Report on Patentability dated Oct. 28, 2014 in International (PCT) Application No. PCT/JP2013/062022.
Extended European Search Report dated Mar. 3, 2016 in corresponding European Application No. 13781398.6.

* cited by examiner

METAL OXIDE DISPERSION, POLYMERIZABLE COMPOSITION COMPRISING THE METAL OXIDE DISPERSION, AND POLYMER THEREOF

TECHNICAL FIELD

The present invention relates to a metal oxide dispersion, a polymerizable composition comprising the metal oxide dispersion, and a polymer thereof. Specifically, the present invention relates to an organic-inorganic hybrid polymer having a high refractive index, which has an excellent transparency and a less impaired scratch resistance; and a metal oxide dispersion and a polymerizable composition used as materials for the polymer.

BACKGROUND ART

Optical materials are used for various uses such as a lens, a film, an optical fiber, a light guide plate for liquid crystal display, and a waveguide. Among them, optical polymer materials play an important role as raw materials supporting the basis of the electronics field and the communication technology such as information display, information storage, and information transmission. Therefore, physical properties such as durability and scratch resistance are required at a high level as well as optical properties such as a high transparency, a high refractive index, and fine control of refractive index.

As a method of increasing the refractive index in an optical polymer material, a method of introducing a substituent such as a halogen, elemental sulfur, and an aromatic group into the polymer is known. However, the method of introducing a halogen has problems such as decrease in transparency due to the coloration of the optical material, and high environmental load. The method of introducing elemental sulfur has problems such as generation of odor derived from sulfur and decrease in stability due to disulfides by-produced from impurities. Furthermore, the method of introducing an aromatic group has problems such as increase in chromatic aberration due to decrease in Abbe number.

As a method of increasing the refractive index in an optical polymer, a method of combining inorganic particles of titanium oxide, zirconium oxide, or the like with an organic constituent is attracting attention. This method does not have such disadvantages as in the above method of introducing a substituent into the polymer, but has a problem of decrease in transparency caused by the agglomeration of the inorganic particles. In order to solve this problem, techniques to disperse the particles have been studied actively.

For example, a method in which a phosphate compound having a polyoxyethylene alkyl structure is used as a dispersing agent for zirconia particles (see, e.g. Patent Literature 1) and a method in which a phosphate compound having an aromatic group is used as a dispersing agent for zirconia particles (see, e.g. Patent Literature 2) are known. It is reported that the transparency of the polymer is improved by the improvement of the dispersibility of the zirconia particles in these methods. However, the transparency is still not sufficient, and further improvement in optical performance has been demanded. Moreover, since the scratch resistance (the hardness of the polymer) is decreased, further improvement in physical performance is also required.

CITATION LIST

Patent Literature

PTL 1: JP 2005-161111 A
PTL 2: JP 2008-201634 A

SUMMARY OF INVENTION

Technical Problem

An objective of the present invention is to provide an organic-inorganic hybrid acrylic polymer having an increased refractive index, which has a higher transparency and a less impaired scratch resistance; and a metal oxide dispersion and a polymerizable composition as materials for the polymer.

Another objective of the present invention is to provide the organic-inorganic hybrid polymer capable of being produced in a crack-free manner; and a high-performance antireflection film using the organic-inorganic hybrid polymer.

Solution to Problem

The present inventors have wholeheartedly carried out investigations, consequently found that the above objectives can be achieved by using a phosphorus compound with a specific structure as a metal dispersion, and completed the present invention based on the obtained knowledge.

That is, the present invention is specified as follows.

[1] A metal oxide dispersion comprising a phosphorus compound represented by the following Formula (1):

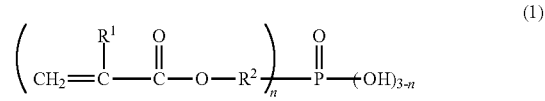

(wherein, $R^1$ is a hydrogen atom, an alkyl group, an alkynyl group, an alkenyl group, an aryl group, an aliphatic heterocyclic group, or an aromatic heterocyclic group; $R^2$ is an organic residue; and n is 1 or 2) and a metal oxide.

[2] The metal oxide dispersion according to the above [1], wherein $R^1$ is a hydrogen atom or a linear or branched alkyl group having 1 to 5 carbon atoms.

[3] The metal oxide dispersion according to the above [1] or [2], wherein $R^2$ is an organic residue represented by the

(wherein, Y is a linear or branched alkylene group having 1 to 10 carbon atoms; and p is an integer of 1 to 10).

[4] The metal oxide dispersion according to the above [3], wherein Y in Formula (2) is a linear or branched alkylene group having 1 to 4 carbon atoms.

[5] The metal oxide dispersion according to any of the above [1] to [4], wherein the metal oxide is a sol.

[6] The metal oxide dispersion according to any of the above [1] to [5], wherein the metal of the metal oxide is at least one selected from the group consisting of titanium, zirconium, hafnium, aluminum, zinc, and tin.

[7] The metal oxide dispersion according to any of the above [1] to [6], wherein the metal of the metal oxide is at least one selected from titanium and zirconium.

[8] The metal oxide dispersion according to any of the above [1] to [7], wherein the molar ratio of the phosphorus atom contained in the phosphorus compound to the metal atom contained in the metal oxide is 0.04 to 1.00.

[9] The metal oxide dispersion according to any of the above [1] to [8], which further comprises an organic solvent.

[10] A polymerizable composition comprising the metal oxide dispersion according to any of the above [1] to [9].

[11] The polymerizable composition according to the above [10], which further comprises a thiol compound.

[12] The polymerizable composition according to the above [10] or [11], which further comprises an acrylic monomer and/or a methacrylic monomer.

[13] A cured product obtainable by curing the polymerizable composition according to any of the above [10] to [12].

[14] The cured product according to the above [13], which is obtainable by light irradiation as the means of curing.

[15] An antireflection film comprising the cured product according to the above [13] or [14].

Advantageous Effects of Invention

A cured product (an organic-inorganic hybrid polymer) having a high refractive index, a higher transparency, and a less impaired scratch resistance, can be provided with use of the metal oxide dispersion of the present invention.

DESCRIPTION OF EMBODIMENTS

[Metal Oxide Dispersion]

Figure 1:
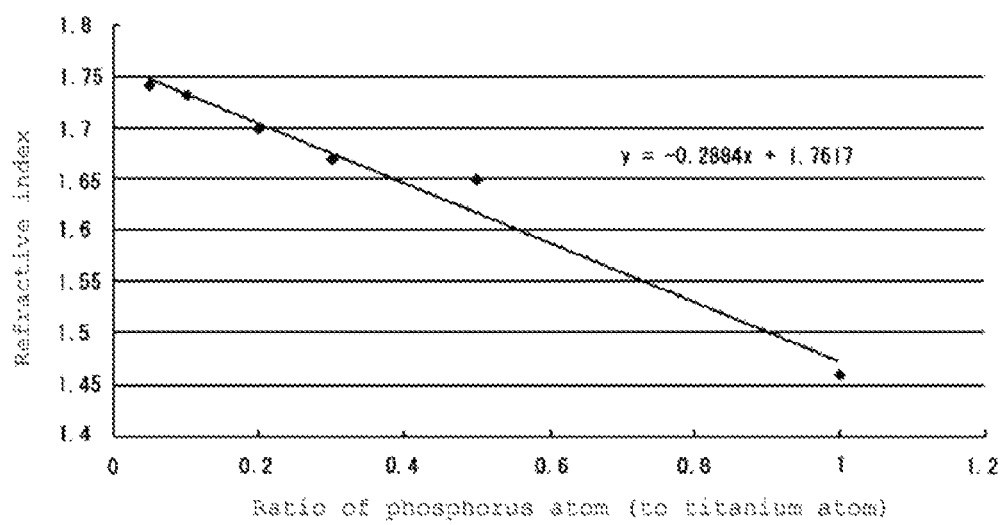
FIG. 1 shows a graph showing the relationship between the ratio of the number of the phosphorus atom to the number of the titanium atom in the metal oxide dispersion and the refractive index.

The metal oxide dispersion of the present invention comprises a phosphorus compound represented by the following Formula (1):

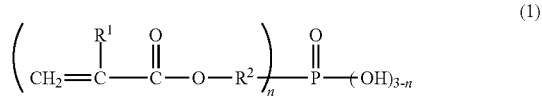

(wherein, $R^1$ is a hydrogen atom, an alkyl group, an alkynyl group, an alkenyl group, an aryl group, an aliphatic heterocyclic group, or an aromatic heterocyclic group; $R^2$ is an organic residue; and n is 1 or 2) and a metal oxide.

[Starting Material of Metal Oxide Dispersion]
[Phosphorus Compound]

The phosphorus compound represented by the above-mentioned Formula (1) is explained in detail below.

The alkyl group represented by $R^1$ may be a linear or branched alkyl group having, for example, 1 to 20 carbon atoms. Examples of the alkyl group include a methyl group, an ethyl group, an n-propyl group, an isopropyl group, an n-butyl group, a sec-butyl group, an isobutyl group, a tert-butyl group, an n-pentyl group, a neopentyl group, a tert-pentyl group, an isopentyl group, a 2-methylbutyl group, a 1-ethylpropyl group, a hexyl group, a 4-methylpentyl group, a 3-methylpentyl group, a 2-methylpentyl group, a 1-methylpentyl group, a 3,3-dimethylbutyl group, a 2,2-dimethylbutyl group, a 1,1-dimethylbutyl group, a 1,2-dimethylbutyl group, a 1,3-dimethylbutyl group, a 2,3-dimethylbutyl group, a 1-ethylbutyl group, a 2-ethylbutyl group, a heptyl group, an octyl group, a nonyl group, a decyl group, a cetyl group, and a stearyl group. The number of carbon atoms in the above-mentioned alkyl group is preferably 1 to 12, and more preferably 1 to 5.

The alkynyl group represented by $R^1$ may be a linear or branched alkynyl group having, for example, 2 to 15 carbon atoms. Examples of the alkynyl group include an ethynyl group, a 1-propynyl group, a 2-propynyl group, a 1-butynyl group, a 3-butynyl group, a pentynyl group, and a hexynyl group. The number of carbon atoms in the alkynyl group is preferably 2 to 10, and more preferably 2 to 6.

The alkenyl group represented by $R^1$ may be a linear or branched alkenyl group having, for example, 2 to 15 carbon atoms. Examples of the alkenyl group include a vinyl group, a 1-propenyl group, an allyl group, a 1-butenyl group, a 2-butenyl group, a 3-butenyl group, a pentenyl group, a hexenyl group, an isopropenyl group, a 2-methyl-2-propenyl group, a 1-methyl-2-propenyl group, and a 2-methyl-1-propenyl group. The number of carbon atoms in the alkenyl group is preferably 2 to 10, and more preferably 2 to 6.

The aryl group represented by $R^1$ is, for example, an aryl group having 6 to 20 carbon atoms. Examples of the aryl group include a phenyl group, a 1-naphthyl group, a 2-naphthyl group, an anthryl group, a phenanthryl group, a 2-biphenyl group, a 3-biphenyl group, a 4-biphenyl group, and a terphenyl group.

The aliphatic heterocyclic group represented by $R^1$ is, for example, a 5- to 8-membered, preferably 5- or 6-membered, monocyclic aliphatic heterocyclic group or a polycyclic or condensed ring aliphatic heterocyclic group, each having 2 to 14 carbon atoms and at least one, preferably 1 to 3 heteroatoms, such as nitrogen, oxygen, and sulfur atoms. Examples of the aliphatic heterocyclic group include a pyrrolidyl-2-one group, a piperidino group, a piperadinyl group, a morpholino group, a tetrahydrofuryl group, a tetrahydropyranyl group, and a tetrahydrothienyl group.

The aromatic heterocyclic group represented by $R^1$ is, for example, a 5- to 8-membered, preferably 5- or 6-membered, monocyclic heteroaryl group or a polycyclic or condensed ring heteroaryl group having 2 to 15 carbon atoms and at least one, preferably 1 to 3 heteroatoms, such as nitrogen, oxygen, and sulfur atoms. Examples of the aromatic heterocyclic group include a furyl group, a thienyl group, a pyrrolyl group, a pyridyl group, a pyrimidyl group, a pyrazyl group, a pyridazyl group, a pyrazolyl group, an imidazolyl group, an oxazolyl group, a thiazolyl group, a benzofuryl group, a benzothienyl group, a quinolyl group, an isoquinolyl group, a quinoxalyl group, a phthalazyl group, a quinazolyl group, a naphthyridyl group, a cinnolyl group, a benzoimidazolyl group, a benzoxazolyl group, and a benzothiazolyl group.

Any hydrogen atom of the alkyl group, the alkynyl group, the alkenyl group, the aryl group, the aliphatic heterocyclic group, or the aromatic heterocyclic group may be replaced with a substituent. The substituent is not particularly limited, and examples thereof include an alkyl group, an alkynyl group, an alkenyl group, an aryl group, an aralkyl group, an alkoxy group, an alkylenedioxy group, an aryloxy group, an aralkyloxy group, a heteroaryloxy group, an alkylthio group, a cycloalkyl group, an aliphatic heterocyclic group, an aromatic heterocyclic group, an arylthio group, an aralkylthio group, a heteroarylthio group, an amino group, a substituted amino group, a cyano group, a hydroxyl group, an oxo group, a nitro group, a mercapto group, and a halogen atom. The number of the substituents is preferably 1 to 3, and more preferably 1 or 2.

$R^1$ is preferably a hydrogen atom or a linear or branched alkyl group having 1 to 5 carbon atoms, more preferably a hydrogen atom or a linear alkyl group having 1 to 3 carbon atoms, and particularly preferably a hydrogen atom or a methyl group.

The organic residue represented by $R^2$ is not particularly limited as long as it is a partial structure of the functional group introduced into the phosphorus compound. Examples of the organic residue include an alkylene group, a cycloalkylene group, an alkynylene group, an alkenylene group, an arylene group, a heteroarylene group, an aralkylene group, an oxyalkylene group, a cycloalkyleneoxy group, an aryleneoxy group, an aralkyleneoxy group, a heteroaryleneoxy group, an alkylenethio group, an arylenethio group, an aralkylenethio group, and a heteroarylenethio group.

The organic residue represented by $R^2$ is preferably a group represented by the following Formula (2):

(2)

(wherein, Y is a linear or branched alkylene group having 1 to 10 carbon atoms; and p is an integer of 1 to 10).

In Formula (2), Y is a linear or branched alkylene group having 1 to 10 carbon atoms, and examples thereof include a methylene group, an ethylene group, a methylethylene group, an ethylethylene group, an n-propylene group, a 1-methylpropylene group, a 2-methylpropylene group, an n-butylene group, an n-hexylene group, an n-heptylene group, and an n-octylene group. Y is preferably a linear alkylene group having 1 to 4 carbon atoms, and particularly preferably a methylene group or an ethylene group.

p is an integer of 1 to 10, preferably an integer of 1 to 5, and particularly preferably an integer of 1 to 3.

The phosphorus compound represented by Formula (1) may be, for example, 2-acryloyloxyethyl acid phosphate, 3-acryloyloxypropyl acid phosphate, 2-acryloyloxypropyl acid phosphate, 6-acryloyloxyhexyl acid phosphate, 10-acryloyloxydecyl acid phosphate, 2-methacryloyloxyethyl acid phosphate, 3-methacryloyloxypropyl acid phosphate, 2-methacryloyloxypropyl acid phosphate, 6-methacryloyloxyhexyl acid phosphate, and 10-methacryloyloxydecyl acid phosphate.

The phosphorus compound used for the present invention may be a commercial product, or a phosphorus compound produced by a known process. Such a commercial product of the phosphorus compound may be, for example, MR-200 manufactured by Daihachi Chemical Industry Co., Ltd. etc.

[Metal Oxide]

The metal oxide of the present invention, which is a compound comprising a metal atom and an oxygen atom as main constituents, may be a metal oxide in the form of particles as they are or in the form of a sol prepared by a known process. Such a sol of the metal, oxide can be manufactured by, for example, a method where a solvent is added to a metal alkoxide or a metal halide to allow hydrolysis and condensation. As the solvent used for the manufacture of the metal oxide sol, any of an inorganic solvent such as water, an organic solvent as described below, and a mixture thereof may be used. The organic solvent is not particularly limited, and examples thereof include lower alcohols such as methanol, ethanol, propanol and isopropanol; linear amides such as dimethylformamide and N,N'-dimethylacetamide; cyclic amides such as N-methyl-2-pyrrolidone; glycols such as ethyl cellosolve, butyl cellosolve, and ethylene glycol; esters; ketones; and hydrocarbons such as toluene and hexane. Specific examples of the mixed solvent include a mixture of toluene, isopropyl alcohol, and water.

The mean particle size of the metal oxide sol is not particularly limited, and may be, for example, 30 to 500 nm. The solid content of the metal oxide sol is not particularly limited, and may be, for example, 2 to 50% by weight.

The metal in the metal oxide is not particularly limited, and examples thereof include titanium, zirconium, hafnium, aluminum, zinc, and tin. Among them, preferred are titanium and zirconium, both of which are capable of increasing the refractive index of the polymer, and particularly preferred is titanium.

Examples of the metal alkoxide include a titanium alkoxide, a zirconium alkoxide, a hafnium alkoxide, an aluminum alkoxide, a zinc alkoxide, and a tin alkoxide.

The titanium alkoxide is not particularly limited, and examples thereof include dialkoxytitanium such as dialkyldialkoxytitanium (e.g. dimethyldimethoxytitanium and diethyldiethoxytitanium); trialkoxytitanium such as trialkoxytitanium (e.g. trimethoxytitanium and triethoxytitanium), alkyltrialkoxytitanium (e.g. ethyltrimethoxytitanium), and aryltrialkoxytitanium (e.g. phenyltrimethoxytitanium); and tetraalkoxytitanium (e.g. tetraalkoxytitanium having 1 to 18 carbon atoms such as tetramethoxytitanium, tetraethoxytitanium, tetrapropoxytitanium, tetraisopropoxytitanium, tetraisobutoxytitanium, tetra-n-butoxytitanium, tetra-t-butoxytitanium, tetranonyloxytitanium, tetrakis(2-ethylhexyloxy)titanium, tetrakis(methoxypropoxy) titanium, tetrastearyloxytitanium, and tetraisostearyloxytitanium. As the tetraalkoxytitanium, preferred are tetraalkoxytitanium having 1 to 10 carbon atoms, and more preferred are tetraalkoxytitanium having 1 to 6 carbon atoms.

The zirconium alkoxide is not particularly limited, and examples thereof include tetraalkoxyzirconium (e.g. tetraalkoxyzirconium having 1 to 18 carbon atoms such as tetramethoxyzirconium, tetraethoxyzirconium, tetraisopropoxyzirconium, tetraisobutoxyzirconium, tetra-n-butoxyzirconium, tetra-t-butoxyzirconium, tetrakis(2-ethylhexyloxy)zirconium, and tetrakis(2-methyl-2-butoxy)zirconium). Preferred are tetraalkoxyzirconium having 1 to 10 carbon atoms, and more preferred are tetraalkoxyzirconium having 1 to 6 carbon atoms.

The hafnium alkoxide is not particularly limited, and examples thereof include tetramethoxyhafnium, tetraethoxyhafnium, tetraisopropoxyhafnium, and tetra-t-butoxyhafnium.

The aluminum alkoxide is not particularly limited, and examples thereof include trialkoxyaluminum (e.g. trimethoxyaluminum, triethoxyaluminum, tripropoxyaluminum, tri-n-butoxyaluminum, tri-s-butoxyaluminum, and tri-t-butoxyaluminum).

The zinc alkoxide is not particularly limited, and examples thereof include diethoxyzinc and bismethoxyethoxyzinc.

The tin alkoxide is not particularly limited, and examples thereof include tetraethoxytin, tetraisopropoxytin, and tetra-n-butoxytin.

Among the above-mentioned metal alkoxides, a titanium alkoxide and a zirconium alkoxide are preferred in view of the realization of a high refractive index of the polymer. Among titanium alkoxides, more preferred are tetraethoxytitanium, tetra-n-propoxytitanium, tetraisopropoxytitanium, tetra-n-butoxytitanium, tetraisobutoxytitanium, tetra-s-butoxytitanium and tetra-t-butoxytitanium. Among zirconium alkoxides, more preferred are tetraethoxyzirconium, tetra-n-propoxyzirconium, tetraisopropoxyzirconium, tetra-n-butoxyzirconium, tetraisobutoxyzirconium, tetra-s-butoxyzirconium, and tetra-t-butoxyzirconium. Among the above-mentioned alkoxides, particularly preferred are tetra-n-butoxytitanium, tetraisobutoxytitanium, tetra-s-butoxytitanium, and tetra-t-butoxytitanium.

The metal halide is not particularly limited, and examples thereof include titanium halides such as titanium tetrachloride and titanium tetrabromide; zirconium halides such as zirconium tetrachloride, zirconium tetrabromide, and zirconium iodide; zirconium oxyhalides such as zirconium oxychloride and zirconium oxyiodide; hafnium halides such as hafnium tetrachloride; hafnium oxyhalides such as hafnium oxychloride; aluminum halides such as aluminum bromide, aluminum chloride, and aluminum iodide; zinc halides such as zinc chloride, zinc bromide, and zinc iodide; and tin halides such as tin chloride, tin bromide, and tin iodide.

Among the above-mentioned metal halides, preferred are titanium tetrachloride, titanium tetrabromide, zirconium tetrachloride, zirconium tetrabromide, and zirconium oxychloride; and particularly preferred are titanium tetrachloride, zirconium tetrachloride, and zirconium oxychloride.

In the present invention, the metal alkoxides and the metal halides may be used alone or in combination of two or more kinds thereof.

[Solvent]

The metal oxide dispersion of the present invention may comprise a solvent. The solvent may be an organic solvent or an inorganic solvent.

The organic solvent is not particularly limited, and examples thereof include alcohols (e.g. alkyl alcohols such as ethanol, propanol, and isopropanol; and glycols such as ethylene glycol and propylene glycol); hydrocarbons (e.g. aliphatic hydrocarbons such as hexane; alicyclic hydrocarbons such as cyclohexane; and aromatic hydrocarbons such as toluene and xylene); halogenated hydrocarbons (e.g. methylene chloride and chloroform); ethers (e.g. chain ethers such as dimethyl ether and diethyl ether; and cyclic ethers such as dioxane and tetrahydrofuran); esters (e.g. methyl acetate, ethyl acetate, butyl acetate, ethyl lactate, and ethylbutyrate); ketones (e.g. acetone, ethyl methyl ketone, methyl isobutyl ketone, cyclohexanone, and N-methyl-2-pyrrolidone); cellosolves (e.g. methyl cellosolve, ethyl cellosolve, and butyl cellosolve); carbitols (e.g. methyl carbitol, ethyl carbitol, and butyl carbitol); propylene glycol monoalkyl ethers (e.g. propylene glycol monomethyl ether, propylene glycol monoethyl ether, and propylene glycol mono-n-butyl ether); glycol ether esters (e.g. ethylene glycol monomethyl ether acetate and propylene glycol monomethyl ether acetate); amides (e.g. N,N-dimethylformamide and N,N-dimethylacetamide); sulfoxides (e.g. dimethyl sulfoxide); nitriles (e.g. acetonitrile and benzonitrile); and N-methylpyrrolidone. Preferred are aromatic hydrocarbons and glycol ether esters; and particularly preferred are toluene and propylene glycol monomethyl ether acetate.

The inorganic solvent is not particularly limited, and examples thereof include acidic aqueous solutions such as hydrochloric acid, sulfuric acid, nitric acid, carbonic acid, and phosphoric acid; basic aqueous solutions such as sodium hydroxide, magnesium hydroxide, calcium hydroxide, potassium hydroxide, and sodium hydrogen carbonate; and neutral aqueous solutions such as pure water and saline solution.

These organic solvents may be used alone or in combination of two or more kinds thereof. Moreover, the solvent may be either an organic solvent or an inorganic solvent, or a mixture thereof.

The solvent is not particularly limited as long as a sufficient amount of the solvent is added to the metal oxide and the phosphorus compound and the metal dispersion provides the effects of the present invention. The amount of the solvent to be used may be, for example, 0.01 to 5000 ml relative to 100 g of the total amount of the metal oxide and the phosphorus compound.

[Dispersion Aid]

The metal oxide dispersion of the present invention may further comprise a dispersion aid. Examples of the dispersion aid include methyl acetoacetate, acetylacetone, and N,N-dimethylacetoacetamide. The dispersion aids may be used alone or in combination of two or more kinds thereof. Among the above dispersion aids, particularly preferred are acetylacetone and N,N-dimethylacetoacetamide in view of safety to a living body.

[Method for Producing Metal Oxide Dispersion]

The metal oxide dispersion of the present invention can be produced by reacting the phosphorus compound and the metal oxide. The molar ratio of the phosphorus atom contained in the phosphorus compound to the metal atom contained in the metal oxide is preferably 0.04 to 1.00, more preferably 0.05 to 0.70, and particularly preferably 0.10 to 0.50. In the case where a sol of the metal oxide is used, the phosphorus compound may be mixed at the time of or after the manufacture of the metal oxide sol.

The reaction conditions of the phosphorus compound and the metal oxide are not particularly limited as long as the phosphorus compound and the metal oxide are sufficiently reacted, but heating is preferred in view of reaction efficiency. Examples of the method for the heating include the use of an electric heater, a heat medium, or microwaves, and the method is not particularly limited. Any method which ensures safe heating may be appropriately selected depending on the amount of the metal oxide dispersion, the scale of the manufacturing equipment, or the like.

In one embodiment of the present invention, the reaction temperature in the production of the metal oxide dispersion may be, for example, 0 to 100° C., and preferably 40 to 80° C. in view of reaction efficiency. The reaction time is usually 1 minute to 5 hours, preferably 1 minute to 2 hours in view of production efficiency, and more preferably about 2 to 30 minutes.

(Metal Oxide Dispersion)

The dispersibility of the metal oxide dispersion in an organic solvent can be improved by coordination or modification of the metal oxide with a phosphorus compound having compatibility with the organic solvent. That is, aggregation of the metal oxide is suppressed and transparency of the metal oxide dispersion is improved.

The metal oxide dispersion, when added to a monomer, can provide a cured product having desirable physical properties such as a high transparency, a high refractive index, and an ability to prevent reduction of scratch resistance.

The metal oxide coordinated or modified with a phosphorus compound in the dispersion has a mean particle size of preferably 0.001 to 5 μm, more preferably 0.01 to 1 μm, and particularly preferably 0.03 to 0.5 μm. When the mean particle size is in the above range, a polymerizable composition produced by mixing the dispersion and a resin can exhibit a high transparency.

The mean particle size of the metal oxide coordinated or modified with a phosphorus compound can be obtained by measuring the mean particle size of the metal oxide in the metal oxide dispersion or its diluted solution by the dynamic light scattering method, using, e.g. a fiber-optics particle analyzer.

[Polymerizable Composition]

The polymerizable composition of the present invention may be prepared by mixing the above-described metal oxide dispersion and a monomer, and a polymerization initiator may be added thereto if desired.

In the present invention, the polymerizable composition can be cured. The resulting cured product has a high transparency regardless of the mixing ratio of the metal oxide dispersion to the monomer. Therefore, the mixing ratio of the metal oxide dispersion to the monomer can be adjusted without limitations so that the cured product may have a target refractive index. In addition, the above-described metal oxide dispersion itself has polymerizability. For this reason, in order to obtain a cured product having a higher refractive index, the metal oxide dispersion may be polymerized without the addition of a monomer.
(Metal Oxide Dispersion)

The metal oxide dispersion used for the preparation of the polymerizable composition may be the same metal oxide dispersion as described above.
(Monomer)

The monomer used for the preparation of the polymerizable composition of the present invention may be any monomer as long as it contains an acryloyl group or a methacryloyl group, and may have any substituent.

The monomer used for the present invention is preferably an acrylic monomer and/or a methacrylic monomer. Examples thereof include acrylic acid; methacrylic acid; acrylic acid esters such as methyl acrylate, ethyl acrylate, butyl acrylate, isobutyl acrylate, 2-ethylhexyl acrylate, cyclohexyl acrylate, 2-methoxyethyl acrylate, 2-hydroxyethyl acrylate, and 2-(dimethylamino)ethyl acrylate; methacrylic acid esters such as methyl methacrylate, ethyl methacrylate, butyl methacrylate, isobutyl methacrylate, 2-ethylhexyl methacrylate, cyclohexyl methacrylate, 2-methoxyethyl methacrylate, 2-hydroxyethyl methacrylate, and 2-(dimethylamino)ethyl methacrylate; polyfunctional acrylic monomers such as propane-1,3-diyl diacrylate, butane-1,4-diyl diacrylate, trimethylolpropane triacrylate (TMPTA), bis-phenoxyethanol fluorene diacrylate (BPEFA), pentaerythritol triacrylate, and dipentaerythritol hexaacrylate (DPHA); and polyfunctional methacrylic monomers such as propane-1,3-diylbis(2-methacrylate) and butane-1,4-diylbis(2-methacrylate).

Among the above-mentioned monomers, preferred are a polyfunctional methacrylic monomer and a polyfunctional acrylic monomer; and particularly preferred are trimethylolpropane triacrylate (TMPTA), bis-phenoxyethanol fluorene diacrylate (BPEFA), pentaerythritol triacrylate, and dipentaerythritol hexaacrylate (DPHA).

The above monomers may be used alone or in combination of two or more kinds thereof.
(Polymerization Initiator)

Examples of the polymerization initiator include a thermal polymerization initiator and a photopolymerization initiator.

Examples of the photopolymerization initiator include benzoins (e.g. benzoin alkyl ethers such as benzoin, benzoin methyl ether, benzoin ethyl ether, benzoin isopropyl ether, and benzoin isobutyl ether); acetophenones (e.g. acetophenone, p-dimethylacetophenone, 2-hydroxy-2-methyl-1-phenylpropane-1-one, 2,2-diethoxyacetophenone, 2,2-dimethoxy-2-phenylacetophenone, 2,2-diethoxy-2-phenylacetophenone, 2-phenyl-2-hydroxy-acetophenone, 1,1-dichloroacetophenone, and 1-hydroxycyclohexyl phenyl ketone); propiophenones (e.g. p-dimethylamino propiophenone, 2-hydroxy-2-methylpropiophenone, and 2,2-dimethoxy-1,2-diphenylethane-1-one); butyrylphenones (e.g. 1-[4-(2-hydroxyethoxy)phenyl]-2-hydroxy-2-methyl-1-propane-1-one, 2-hydroxy-2-methyl-1-phenylpropane-1-one, and 1-(4-isopropylphenyl)-2-hydroxy-2-methyl-propane-1-one]; aminoacetophenones [e.g. 2-methyl-2-morpholino (4-thiomethylphenyl) propane-1-one, 2-methyl-1-[4-(methylthio)phenyl]-2-morpholinopropane-1-one, 2-benzyl-2-dimethylamino-1-(4-morpholinophenyl)-butane-1-one, 2-dimethylamino-2-methyl-1-phenylpropane-1-one, 2-diethylamino-2-methyl-1-phenylpropane-1-one, 2-methyl-2-morpholino-1-phenylpropane-1-one, 2-dimethylamino-2-methyl-1-(4-methylphenyl) propane-1-one, 1-(4-butylphenyl)-2-dimethylamino-2-methylpropane-1-one, 2-dimethylamino-1-(4-methoxyphenyl)-2-methylpropane-1-one, 2-dimethylamino-2-methyl-1-(4-methylthiophenyl) propane-1-one, and 2-benzyl-2-dimethylamino-1-(4-dimethylaminophenyl)-butane-1-one); benzophenones (e.g. benzophenone, benzyil, N,N'-bis(dimethylamino)benzophenone (Michler's ketone), and N,N'-dialkylamino benzophenone such as 3,3-dimethyl-4-methoxybenzophenone); ketals (e.g. acetophenone dimethyl ketal and benzyl dimethyl ketal); thioxanthenes (e.g. thioxanthene, 2-chlorothioxanthene, and 2,4-diethyl thioxanthene); anthraquinones (e.g. 2-ethylanthraquinone, 1-chloroanthraquinone, 1,2-benzanthraquinone, and 2,3-diphenylanthraquinone); (thio) xanthones (e.g. thioxanthone, 2,4-dimethylthioxanthone, 2,4-diethylthioxanthone, 2-chlorothioxanthone, and 2,4-diisopropylthioxanthone); acridines (e.g. 1,3-bis-(9-acridinyl)propane, 1,7-bis-(9-acridinyl)heptane, and 1,5-bis-(9-acridinyl)pentane); triazines (e.g. 2,4,6-tris (trichloromethyl)-s-triazine, 2-(4-methoxyphenyl)-4,6-bis (trichloromethyl)-s-triazine, and 2,4-bis-trichloromethyl-6-(3-bromo-4-methoxy)styrylphenyl-s-triazine); sulfides (e.g. benzyldiphenyl sulfide); acyl phosphine oxides (e.g. 2,4,6-trimethyl benzoyldiphenyl phosphine oxide); a titanocene-based photopolymerization initiator; and oxime esters. These photopolymerization initiators can be used alone or in combination of two or more kinds thereof.

Examples of the thermal polymerization initiator include organic peroxides such as dialkyl peroxides (e.g. di-t-butyl peroxide and dicumyl peroxide), diacyl peroxides [e.g. dialkanoyl peroxides (lauroyl peroxide etc.) and diaroyl peroxides (benzoyl peroxide, benzoyl toluyl peroxide, toluyl peroxide, etc.)], peracid esters [e.g. percarboxylic acid alkyl esters such as t-butyl peracetate, t-butyl peroxyoctoate, and t-butyl peroxybenzoate], ketone peroxides, peroxycarbonates, and peroxyketals; and azo compounds such as azonitrile compounds [e.g. 2,2'-azobis(2,4-dimethylvaleronitrile), 2,2'-azobis(isobutyronitrile), 2,2'-azobis(2-methylbutyronitrile), and 2,2'-azobis(4-methoxy-2,4-dimethylvaleronitrile)], azoamide compounds (e.g. 2,2'-azobis(2-methyl-N-[1,1-bis(hydroxymethyl)-2-hydroxyeth yl]propionamide)), azoamidine compounds {e.g. 2,2'-azobis(2-amidinopropane)dihydrochloride and 2,2'-azobis [2-(2-imidazolin-2-yl) propane]dihydrochloride}, azoalkane compounds (e.g. 2,2'-azobis(2,4,4-trimethylpentane) and 4,4'-azobis(4-cyanopentanoic acid)], and azo compounds having an oxime structure [e.g. 2,2'-azobis(2-methylpropionamidoxime)]. The thermal polymerization initiators can be used alone or in combination of two or more kinds thereof.

Among the above-mentioned polymerization initiators, photopolymerization initiators are preferred as the polymerization initiator used for the present invention.
(Thiol Compound)

In the present invention, a crack may occur when no monomer is added to the polymerizable composition and the film thickness of the cured product is large. In such a case, occurrence of a crack in the cured product can be suppressed by the addition of a thiol to the polymerizable composition. The reason is not clear but thought to be that a sulfide bond formed by a thiol-ene reaction or a thiol-Michael addition imparts toughness to the composition. The thiol is preferably a polyfunctional thiol, more preferably a bifunctional to hexafunctional thiol, and particularly preferably a bifunctional to tetrafunctional thiol. Specific examples of the thiol include bifunctional thiol compounds such as tetraethylene glycol bis(3-mercaptopropionate); trifunctional thiol compounds such as 1,3,5-tris(3-mercaptopropionyloxy ethyl)

isocyanurate, 1,3,5-tris(3-mercaptobutyryloxy ethyl) isocyanurate (KarenzMT (registered trademark) NR1 manufactured by Showa Denko K.K.), and trimethylolpropane tris (3-mercaptopropionate); tetrafunctional thiol compounds such as pentaerythritol tetrakis(3-mercaptopropionate), pentaerythritol tetrakis(3-mercaptobutyrate) (KarenzMT (registered trademark) PEI manufactured by Showa Denko K.K), pentaerythritol tetrakis (3-thioglycolate), and pentaerythritol tetrakis (3-thiolactate); and hexafunctional thiol compounds such as dipentaerythritol hexakis(3-mercaptopropionate).

The addition amount of the thiol is preferably more than 5% by weight, more preferably 7% by weight or more, and particularly preferably 10% by weight or more, relative to the total weight of the metal oxide modified with the phosphorus compound and the thiol compound in the polymerizable composition. Moreover, the addition amount is preferably 30% by weight or less, more preferably 25% by weight or less, and particularly preferably 20% by weight or less. That is, the addition amount is preferably more than 5 and 30% by weight or less, more preferably 7 to 25% by weight, and particularly preferably 10 to 20% by weight. The cured product maintains a high refractive index and the effect of the suppression of cracks can be obtained as long as the addition amount is in the above range.

The "weight of the metal oxide modified with the phosphorus compound in the polymerizable composition" is obtained by the following Calculation Formula (I).

"weight of metal oxide modified with phosphorus compound in polymerizable composition"=(i)+(ii)+(iii)+(weight of phosphorus compound used for metal oxide dispersion)     Calculation Formula (I):

In the above Calculation Formula (I),
(i) represents (metal oxide used for metal oxide dispersion);
(ii) represents {(number of moles of metal alkoxide used for metal oxide dispersion)×(molecular weight of corresponding metal oxide)}; and
(iii) represents {(number of moles of metal halide used for metal oxide dispersion)×(molecular weight of corresponding metal oxide)}.
(Optional Substance)

The polymerizable composition of the present invention may comprise a conventional additive, if desired, to an extent where the effect of the present invention is not inhibited. Examples of the additive include a pigment, a colorant, a thickening agent, a sensitizer, a defoaming agent, a leveling agent, a coating improver, a lubricant, a stabilizer (an antioxidant, a heat stabilizer, a light-resistant stabilizer, etc.), a plasticizer, a surface active agent, a dissolution accelerator, a filler, an antistatic agent, a curing agent, and a flame retardant. These additives may be used alone or in combination of two or more kinds thereof.
(Property and Use)

The polymerizable composition of the present invention, which comprises the metal oxide dispersion, can provide a cured product with desirable physical properties such as a high transparency and a high refractive index, and desirable properties such as an ability to prevent reduction of scratch resistance.
[Cured Product]
(Method for Producing Cured Product)

The cured product of the present invention can be produced by subjecting the polymerizable composition to a curing reaction or a cross-linking reaction.

The method for producing the cured product is not particularly limited, and examples thereof include a method in which the curing is performed by light irradiation, heating or pattern exposure after the application of the polymerizable composition onto a base material for the formation of a coating film. The cured product is preferably produced by photopolymerization for easy treatment operations.
(Base Material)

The base material is selected depending on the use and not particularly limited. The material may be, for example, a semiconductor (e.g. silicon, gallium, arsenic, gallium nitride, and silicon carbide), a metal (e.g. aluminum and copper), a ceramic (e.g. zirconium oxide, titanium oxide, and PZT), a transparent inorganic material (e.g. glass, quartz, magnesium fluoride, and calcium fluoride), a transparent resin (e.g. polyethylene terephthalate and polymethyl methacrylate), etc.
(Formation of Coating Film)

In the present invention, the method for applying the polymerizable composition onto the base material is not particularly limited, and may be, for example, a flow coating method, a spin coating method, a spray coating method, a screen printing method, a casting method, a bar coating method, a curtain coating method, a roll coating method, a gravure coating method, a dipping method, and a slit method.

The thickness of the coating film can be selected depending on the use of the cured product. The thickness may be, for example, 0.01 μm to 1 mm, preferably 0.05 to 700 μm, and further preferably 0.1 to 500 μm.
(Curing Treatment)

In one embodiment of the present invention, the coating film may be cured by light irradiation.

The light used for light irradiation is not particularly limited. Examples thereof include a gamma ray, an X ray, an ultraviolet ray (UV), and a visible ray, and in view of the ease of handling, a visible ray and an ultraviolet ray (UV) are preferred. The wavelength of the light to be used may be 150 to 800 nm. In view of curing efficiency, the wavelength may be preferably 150 to 600 nm, and more preferably 200 to 400 nm.

The amount of irradiation light (irradiation energy) can be selected depending on the thickness of the coating film or the like. The amount of irradiation light is not particularly limited, and may be, for example, 1 to 10000 mW. In view of curing efficiency, the amount may be preferably 5 to 5000 mW, and more preferably about 10 to 1000 mW. The irradiation time is not particularly limited, and may be, for example, 1 second to 10 minutes. In view of production efficiency, the irradiation time may be preferably 5 seconds to 5 minutes, and most preferably 10 seconds to 3 minutes.

In another embodiment of the present invention, the curing reaction or the cross-linking reaction may be performed by heat-treating the coating film. Heating the coating film may be performed in combination with light irradiation. When combined with light irradiation, heating may be performed at the same time as, before, or after light irradiation, and heating after light irradiation (after-cure) is particularly preferred.

The temperature in the heat treatment is not particularly limited as long as the curing reaction or the cross-linking reaction sufficiently proceeds, and may be, for example, 60 to 200'C. In view of reaction efficiency, the temperature may be preferably 80 to 150° C. The time of heat treatment is not particularly limited as long as the curing reaction or the cross-linking reaction sufficiently proceeds, and is usually 3 seconds to 1 hour. In view of reaction efficiency, the time is preferably 5 seconds to 30 minutes, more preferably about 20 seconds to 30 minutes, and particularly preferably 30 seconds to 10 minutes.

In a further embodiment of the present invention, the coating film may be cured by pattern exposure to form a pattern or an image. Accordingly, a printed wiring substrate or the like can be produced.

The pattern exposure method is not particularly limited, and may be carried out by laser beam scanning or light irradiation through a photomask. Then unexposed regions are developed or dissolved using a developer to give a pattern or an image.

The developer can be water, an alkaline aqueous solution, a hydrophilic solvent (e.g. alcohols such as methanol, ethanol, and isopropanol; ketones such as acetone; ethers such as dioxane and tetrahydrofuran; cellosolves; and cellosolve acetates), a mixed liquid thereof, etc.

In one embodiment of the present invention, the coating film may be heated after exposure. In this case, the developing process may be performed before or after the heating process. The heating after exposure enables the formation of a fine and highly precise pattern on a base material even with a small amount of light exposure.

(Type of Cured Product)

The shape of the cured product of the present invention is not particularly limited, and the cured product may be any of a three-dimensional, two-dimensional, or one-dimensional product; a point-like or dot-like product, etc. Specific examples thereof include a cured film and a patterned cured film. The polymerizable composition of the present invention can be used for producing a thin film on a base material, for example.

One single layer or multiple layers of the cured product of the present invention may be formed on a base material. Moreover, the cured product of the present invention may be formed on a different kind of functional layer formed on a base material.

(Property of Cured Product)

Since the polymerizable composition comprises the metal oxide dispersion, the cured product of the present invention is excellent in hard court property and optical properties such as a high transparency for visible light and a high refractive index.

The refractive index of the cured product is preferably 1.45 or more, more preferably 1.50 or more, further preferably 1.55 or more, and particularly preferably 1.60 or more. The refractive index of the cured product can be measured at a wavelength of 633 nm using a reflective film thickness monitor, for example.

The total light transmittance of the cured product is preferably 80% or more, more preferably 85% or more, and particularly preferably 88% or more. The haze value of the cured product is preferably 1.0 or less, more preferably 0.5 or less, and particularly preferably 0.3 or less.

The total light transmittance and the haze value of the cured product can be measured using a UV-Vis spectrophotometer in accordance with JIS K7105 and JIS K7136, for example.

The metal oxide dispersion used for the cured product comprises the phosphorus compound represented by Formula (1), and as a result, the reduction of scratch resistance of the cured product can be suppressed.

Herein, scratch resistance means the surface hardness of the cured product (polymer). A cured product having a high scratch resistance is less likely to be scratched, and therefore can be used for applications requiring durability or the like. Scratch resistance can be evaluated using a hand push pencil scratch hardness tester (made by Coating Tester) in accordance with JIS K5600-5-4. Measurement is repeated five times to determine the pencil hardness causing damage at an incidence rate of 20% or less.

(Use of Cured Product)

The cured product of the present invention can be used suitably for a high refractive index layer of an antireflection film used for a liquid crystal display or the like, an optical thin film and a coating agent for optics of a reflecting plate or the like, an index matching layer, an optical filter, a heat ray cut filter, or the like.

(Antireflection Film)

The antireflection film of the present invention has a high refractive index layer whose refractive index is 1.6 to 1.8, and a low refractive index layer whose refractive index is 1.35 to 1.55. The thickness of the low refractive index layer is not particularly limited as long as antireflection performance is sufficiently exhibited, and is usually 50 to 300 nm. In view of antireflection performance, the thickness is preferably 100 to 200 nm, and particularly preferably about 150 nm. The antireflection film of the present invention has a reflectance reduced by utilizing the principle of optical interference. Therefore, to obtain a desired reflectance, a person skilled in the art can appropriately adjust the refractive index, the layer thickness, etc. of each layer.

The high refractive index layer used for the antireflection film is preferably the cured product of the present invention with an increased refractive index. The low refractive index layer is not particularly limited, and may be, for example, an acrylic hard coated resin.

In a preferable embodiment of the present invention, when the thickness of the low refractive index layer of the antireflection film is set at about 150 nm, antireflection performance for light having a wavelength in a range of 550 to 600 nm (most easily perceivable visible light for the human) is remarkably improved.

EXAMPLES

The present invention is described in more detail below based on examples. However, the present invention is not limited to these examples.

The substances, the reagents, and the measuring equipment used are shown below. The substances or the like used were commercial products or substances produced by a publicly known process unless otherwise stated.

(Material)

[Phosphorus Compound]

TABLE 1

| Abbreviation | Substance name | Chemical formula | Remarks |
| --- | --- | --- | --- |
| MR-200 (trade name) | 2-Methacryloyloxyethyl acid phosphate (manufactured by Daihachi Chemical Industry Co., Ltd., mean molecular weight: 266) | 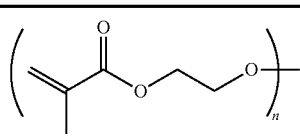 | In the formula, n represents 1 or 2. |
| MP-4 (trade name) | Monobutyl phosphate (manufactured by Daihachi Chemical Industry Co., Ltd., mean molecular weight: 148) | 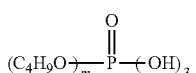 | In the formula, m represents an interger of 1 to 3. |

TABLE 1-continued

| Abbreviation | Substance name | Chemical formula | Remarks |
| --- | --- | --- | --- |
| MP-10 (trade name) | Monoisodecyl phosphate (manufactured by Daihachi Chemical Industry Co., Ltd., mean molecular weight: 260) | 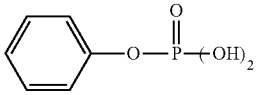 | In the formula, r represents an integer of 0 to 3. |
| Phenylphosphate | Phenylphosphate | | |

[Metal Alkoxide]
Tetra-n-butoxytitanium
[Acrylic Monomer]
Trimethylolpropane triacrylate (TMPTA)
Bis-phenoxyethanol fluorene diacrylate (BPEFA)
Dipentaerythritol hexaacrylate (DPHA)
[Photopolymerization Initiator]
2-Hydroxy-2-methyl-1-phenylpropane-1-one (Darocur 1173 manufactured by Ciba-Geigy)
[Organic Solvent]
Toluene
Isopropyl alcohol (IPA)
[Thiol Compound]
Tetraethylene glycol bis(3-mercaptopropionate) (EGMP-4)

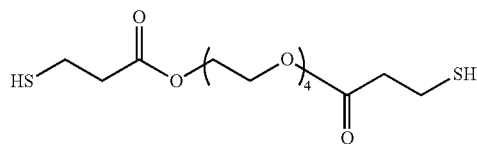

Trimethylolpropane tris(3-mercaptopropionate) (TMMP)

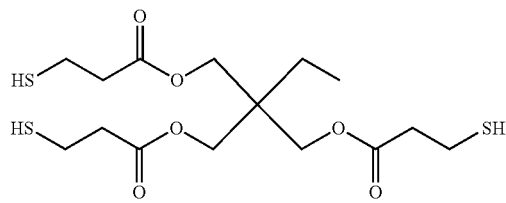 [SMILES: CCC(COC(=O)CCS)(COC(=O)CCS)COC(=O)CCS]

Pentaerythritol tetrakis(3-mercaptopropionate) (PEMP)

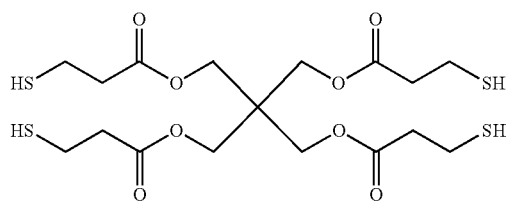 [SMILES: O=C(CCS)OCC(COC(=O)CCS)(COC(=O)CCS)COC(=O)CCS]

(Measuring Method: Physical Property of Metal Oxide Dispersion or Diluted Solution Thereof)

The mean particle size of the metal oxide was measured by the dynamic light scattering method. Specifically, the mean particle size of the metal oxide coordinated or modified with the phosphorus compound in solution was measured using a fiber-optics particle analyzer (FPAR-1000 made by Otsuka Electronics Co., Ltd.).

(Measuring Method: Physical Property of Cured Product)

The total light transmittance and the haze value of the cured product were measured using a UV-Vis spectrophotometer (V-560 made by Jasco Corp.) in accordance with JIS K7105 and JIS K7136.

The refractive index of the cured product was measured at a wavelength of 633 nm using a reflective film thickness monitor (FE-3000 made by Otsuka Electronics Co., Ltd.).

The pencil hardness (scratch resistance) of the cured product was measured using a hand push pencil scratch hardness tester (made by Coating Tester) in accordance with JIS K5600-5-4. Measurement was repeated five times to determine the pencil hardness causing damage at an incidence rate of 20% or less.

(Measuring Method: Reflectance of Antireflection Film)

The reflectance of the antireflection film was measured using a UV-Vis spectrophotometer. Specifically, the reflectance was measured using the UV-Vis spectrophotometer (V-560 made by Jasco Corp.) with a single reflection attachment (SLM-468 made by Jasco Corp.).

(Preparation of Metal Oxide Dispersion)

(Preparation of Metal Oxide Dispersion 1)

In a 10-ml glass sample bottle, 200 mg (0.59 mmol) of tetra-n-butoxytitanium was dissolved in 2 g of toluene. To the solution, 46.9 mg (0.18 mmol) of MR-200 as the phosphorus compound, 1.6 g of IPA, and 53.8 mg (3.0 mmol) of water were added. The solution was heated to 60° C. and irradiated with microwaves for 2 minutes, and the temperature was maintained until the solution became cloudy. The mixed liquid was concentrated under reduced pressure until it became clear to give Metal Oxide Dispersion 1.

In the preparation of Metal Oxide Dispersion 1, the titanium oxide was modified with the phosphorus compound in a ratio of 1 mol of titanium to 0.3 mol of phosphorus.

(Preparation of Metal Oxide Dispersions 2 to 4)

The same procedure was performed as in the preparation of Metal Oxide Dispersion 1, except that different types of phosphorus compounds and the amounts thereof as shown in Table 2 were used.

The types of phosphorus compounds and the amounts thereof used for the preparation of the metal oxide dispersions, and the mean particle sizes of the metal oxides in the obtained metal oxide dispersions are shown in Table 2.

TABLE 2

| | Experiment conditions | | Results |
| --- | --- | --- | --- |
| | Type of phosphorus compound | Amount of phosphorus compound | Mean particle size of metal oxide |
| Metal Dispersion 1 | MR-200 | 46.9 mg (0.18 mmol) | 0.06 μm |

TABLE 2-continued

| | Experiment conditions | | Results |
|---|---|---|---|
| | Type of phosphorus compound | Amount of phosphorus compound | Mean particle size of metal oxide |
| Metal Dispersion 2 | MP-4 | 27.2 mg (0.18 mmol) | 0.57 μm |
| Metal Dispersion 3 | MP-10 | 41.7 mg (0.16 mmol) | 1.61 μm |
| Metal Dispersion 4 | Phenylphosphate | 30.7 mg (0.18 mmol) | 0.04 μm |

Formation of Polymerizable Composition and Cured Product

Example 1

To Metal Oxide Dispersion 1, 376 mg of TMPTA as the acrylic monomer and 4.7 mg of 2-hydroxy-2-methyl-1-phenylpropane-1-one as the photopolymerization initiator were added to give a polymerizable composition. The polymerizable composition was stirred, spin-coated onto a 50 mm×50 mm glass substrate at a rotation speed of 700 rpm, heated at a temperature of 55° C. for 30 minutes, and irradiated with UV light for 2 minutes to give a cured product with a film thickness of 1 μm.

Examples 2 to 12, Comparative Examples 1 to 39

The same procedure was performed as in Example 1, except that the metal dispersions, the acrylic monomers, and the amounts of the acrylic monomers were as shown in Table 3.

The compositions of the polymerizable compositions and the ratios of the acrylic monomers are shown in Table 3. The ratio of the acrylic monomer is obtained by dividing the amount of the acrylic monomer (mg) by the amount of the polymerizable composition (mg, not including, however, the amount of the solvent).

Furthermore, the total light transmittance, the haze value, and the refractive index of each cured product obtained in Examples 1 to 12 and Comparative Examples 1 to 39 were evaluated by the measuring method described above. The results are shown in Table 3. "NM" in the row of the refractive index, which stands for "not measurable", indicates that the refractive index could not be measured because the cured product became cloudy.

TABLE 3

| | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 | Comparative Example 3 |
|---|---|---|---|---|---|---|---|---|---|---|---|---|---|---|---|
| Metal dispersion | Metal Dispersion 1 | | | | | | | | | | | | No metal dispersion | | |
| Type of acrylic monomer | TMPTA | | | | BPEFA | | | | DPHA | | | | TMPTA | BPEFA | DPHA |
| Amount of acrylic monomer | 376 | 141 | 62.6 | 23.5 | 376 | 141 | 62.6 | 23.5 | 376 | 141 | 62.6 | 23.5 | 500 | 500 | 500 |
| Ratio of acrylic monomer (wt %) | 80 | 60 | 40 | 20 | 80 | 60 | 40 | 20 | 80 | 60 | 40 | 20 | 100 | 100 | 100 |
| Total light transmittance (%) | 91.9 | 91.4 | 91.1 | 90.8 | 89.7 | 89.7 | 89.3 | 89.7 | 91.7 | 91.1 | 90.7 | 89.8 | 92.1 | 91.0 | 91.0 |
| Haze value (%) | 0.2 | 0.1 | 0.1 | 0.1 | 0.1 | 0.1 | 0.1 | 0.1 | 0.2 | 0.2 | 0.1 | 0.1 | 0.2 | 0.1 | 0.2 |
| Refractive index | 1.53 | 1.57 | 1.60 | 1.65 | 1.64 | 1.65 | 1.65 | 1.66 | 1.55 | 1.58 | 1.61 | 1.64 | 1.47 | 1.63 | 1.49 |

| | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|---|---|---|
| Metal dispersion | Metal Dispersion 2 | | | | | | | | | | | |
| Type of acrylic monomer | TMPTA | | | | BPEFA | | | | DPHA | | | |
| Amount of acrylic monomer | 297 | 111 | 49.5 | 18.5 | 297 | 111 | 49.5 | 18.5 | 297 | 111 | 49.5 | 18.5 |
| Ratio of acrylic monomer (wt %) | 80 | 60 | 40 | 20 | 80 | 60 | 40 | 20 | 80 | 60 | 40 | 20 |
| Total light transmittance (%) | 84.3 | 79.4 | 80.3 | 88.8 | 87.3 | 80.7 | 81.9 | 88.6 | 90.8 | 84.4 | 87.0 | 90.5 |

TABLE 3-continued

| | | | | | | | | | | | | |
|---|---|---|---|---|---|---|---|---|---|---|---|---|
| Haze value (%) | 30.5 | 78.9 | 46.3 | 1.0 | 37.2 | 51.7 | 24.4 | 0.2 | 5.2 | 23.4 | 5.3 | 0.2 |
| Refractive index | NM | NM | NM | 1.63 | NM | NM | NM | 1.68 | NM | NM | NM | 1.67 |

| | Comparative Example 16 | Comparative Example 17 | Comparative Example 18 | Comparative Example 19 | Comparative Example 20 | Comparative Example 21 | Comparative Example 22 | Comparative Example 23 | Comparative Example 24 | Comparative Example 25 | Comparative Example 26 | Comparative Example 27 |
|---|---|---|---|---|---|---|---|---|---|---|---|---|
| Metal dispersion | Metal Dispersion 3 | | | | | | | | | | | |
| Type of acrylic monomer | TMPTA | | | | BPEFA | | | | DPHA | | | |
| Amount of acrylic monomer | 357 | 133 | 59.1 | 22.2 | 357 | 133 | 59.1 | 22.2 | 357 | 133 | 59.1 | 22.2 |
| Ratio of acrylic monomer (wt %) | 80 | 60 | 40 | 20 | 80 | 60 | 40 | 20 | 80 | 60 | 40 | 20 |
| Total light transmittance (%) | 82.1 | 83.9 | 88.6 | 90.5 | 86.4 | 86.6 | 88.7 | 89.1 | 88.9 | 87.4 | 89.4 | 90.7 |
| Haze value (%) | 73.8 | 56.4 | 11.1 | 0.2 | 55.4 | 38.2 | 5.1 | 0.5 | 27.5 | 17.1 | 2.3 | 0.2 |
| Refractive index | NM | NM | NM | 1.63 | NM | NM | NM | 1.65 | NM | NM | NM | 1.63 |

| | Comparative Example 28 | Comparative Example 29 | Comparative Example 30 | Comparative Example 31 | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|---|---|---|
| Metal dispersion | Metal Dispersion 4 | | | | | | | | | | | |
| Type of acrylic monomer | TMPTA | | | | BPEFA | | | | DPHA | | | |
| Amount of acrylic monomer | 311 | 117 | 51.8 | 19.4 | 311 | 117 | 51.8 | 19.4 | 311 | 117 | 51.8 | 19.4 |
| Ratio of acrylic monomer (wt %) | 80 | 60 | 40 | 20 | 80 | 60 | 40 | 20 | 80 | 60 | 40 | 20 |
| Total light transmittance (%) | 89.3 | 86.4 | 88.2 | 87.6 | 88.9 | 85.9 | 87.2 | 88.6 | 90.4 | 89.6 | 89.3 | 89.7 |
| Haze value (%) | 14.8 | 19.6 | 1.6 | 0.1 | 7.4 | 8.9 | 3.5 | 0.3 | 0.1 | 1.2 | 0.3 | 0.1 |
| Refractive index | NM | NM | NM | 1.69 | NM | NM | NM | 1.70 | 1.56 | NM | NM | 1.69 |

(Evaluation)

Examples 1 to 12, where different types of acrylic monomers in different amounts are used, also provide a highly transparent cured product having a haze value of 0.2% or less. Therefore, when MR-200 is used as the phosphorus compound, a cured product which maintains transparency and has a high refractive index can be provided. Furthermore, the refractive index was found to be freely adjustable.

(Measurement of Pencil Hardness (Scratch Resistance) of Cured Product)

Under the conditions where the same type and the same amount of acrylic monomer and different types of phosphorus compounds were used, the relationship between the phosphorus compound and the pencil hardness was investigated. The results are shown in Table 4.

TABLE 4

| | Conditions | | | Results |
|---|---|---|---|---|
| | Type of acrylic monomer | Ratio of acrylic monomer (% by weight) | Type of phosphorus compound | Pencil hardness |
| Example 4 | TMPTA | 20 | MR-200 | 4H |
| Comparative Example 7 | | | MP-4 | H |
| Comparative Example 19 | | | MP-10 | 3B |
| Comparative Example 31 | | | Phenylphosphate | 2B |
| Example 8 | BPEFA | 20 | MR-200 | H |
| Comparative Example 11 | | | MP-4 | 3B |
| Comparative Example 23 | | | MP-10 | 4B |
| Comparative Example 35 | | | Phenylphosphate | 5B |
| Example 12 | DPHA | 20 | MR-200 | 5H |
| Comparative | | | MP-4 | 2H |

TABLE 4-continued

| | Conditions | | Results |
|---|---|---|---|
| Type of acrylic monomer | Ratio of acrylic monomer (% by weight) | Type of phosphorus compound | Pencil hardness |
| Example 15 Comparative Example 27 | | MP-10 | HB |
| Comparative Example 39 | | Phenyl-phosphate | HB |

Table 4 shows that the cured product prepared using MR-200 as the phosphorus compound in the metal dispersion is more excellent in hardness (scratch resistance) as compared to those prepared using other phosphorus compounds.

Relationship Between Ratio of Number of Phosphorus Atoms to Number of Titanium Atoms in Metal Oxide Dispersion and Refractive Index Test Example 1: Preparation of Cured Product To Metal Oxide Dispersion 1, 4.7 mg of 2-hydroxy-2-methyl-1-phenylpropane-1-one as the photopolymerization initiator was added to give a composition. The composition was stirred, spin-coated onto a 50 mm×50 mm glass substrate at a rotation speed of 500 rpm, heated at a temperature of 55° C. for 30 minutes, and irradiated with UV light for 2 minutes to give a cured product with a film thickness of 1 μm. The refractive index of the obtained cured product was measured by the method described above.

Test Examples 2 to 6

The same procedure was performed as in the preparation of Metal Oxide Dispersion 1, except that the type of phosphorus compound and the amounts thereof as shown in Table 5 were used, to give Metal Oxide Dispersions 5 to 9.

TABLE 5

| | Experiment conditions | | Results |
|---|---|---|---|
| | Type of phosphorus compound | Amount of phosphorus compound | Mean particle size of metal: oxide |
| Metal Dispersion 1 | MR-200 | 46.9 mg (0.18 mmol) | 0.06 μm |
| Metal Dispersion 5 | MR-200 | 8.0 mg (0.03 mmol) | 0.37 μm |
| Metal Dispersion 6 | MR-200 | 15.7 mg (0.06 mmol) | 0.27 μm |
| Metal Dispersion 7 | MR-200 | 31.3 mg (0.12 mmol) | 0.08 μm |
| Metal Dispersion 8 | MR-200 | 78.2 mg (0.29 mmol) | 0.05 μm |
| Metal Dispersion 9 | MR-200 | 156.5 mg (0.59 mmol) | Not measurable |

The same procedure was performed as in Test Example 1, except that Metal Oxide Dispersions 5 to 9 were used in place of Metal Oxide Dispersion 1. The results are shown in Table 6. The relationship between the ratio of the number of phosphorus atoms to the number of titanium atoms in the metal oxide dispersion and the refractive index is shown in FIG. 1.

TABLE 6

| | Metal oxide dispersion | Ratio of number of phosphorus atoms to number of titanium atoms | Refractive index |
|---|---|---|---|
| Test Example 1 | Metal Oxide Dispersion 1 | 0.30 | 1.67 |
| Test Example 2 | Metal Oxide Dispersion 5 | 0.05 | 1.74 |
| Test Example 3 | Metal Oxide Dispersion 6 | 0.10 | 1.73 |
| Test Example 4 | Metal Oxide Dispersion 7 | 0.20 | 1.70 |
| Test Example 5 | Metal Oxide Dispersion 8 | 0.50 | 1.65 |
| Test Example 6 | Metal Oxide Dispersion 9 | 1.00 | 1.46 |

Table 6 and FIG. 1 show that the refractive index of the metal oxide modified with the phosphorus compound changes with the ratio of the number of phosphorus atoms to the number of titanium atoms.

The refractive indexes in Table 6 and FIG. 1 are each the value of a cured product formed of only a metal oxide dispersion and a photopolymerization initiator. To obtain a cured product having an improved refractive index by adding a metal oxide dispersion to a monomer, the refractive index of the cured product of the metal oxide dispersion shown above must be higher than those of the acrylic polymers (TMPTA: 1.47, BPEFA: 1.63, and DPHA: 1.49).

Test Example 7

The production of a metal oxide dispersion was attempted in the same way as the production of Metal Oxide Dispersion 1, except that 4.7 mg (0.018 mmol) of MR-200 was used as the phosphorus compound. However, the metal oxide turned into a gel, and consequently the metal oxide dispersion could not be well produced.

In this preparation, the phosphorus compound is used in a ratio of 0.03 mol to the titanium oxide containing 1 mol of titanium.

Prevention of Cracks in Cured Product

Example 13

The polymerizable composition obtained by mixing 1000 mg of Metal Dispersion 6 (100 mg of the metal oxide modified with the phosphorus compound), 11.1 mg of TMMP as the thiol compound, and 5.33 mg of 2-hydroxy-2-methyl-1-phenylpropane-1-one as the photopolymerization initiator was spin-coated onto a 50 mm×50 mm glass substrate at a rotation speed of 1000 rpm, heated at a temperature of 55° C. for 30 minutes, and irradiated with UV light for 1 minute to give a cured product with a film thickness of 0.7 μm. The occurrence of a crack in the obtained cured product was not visually observed, and the refractive index was 1.76.

Example 14

The same procedure was performed as in Example 13, except that 17.6 mg of TMMP was used, to give a cured product with a film thickness of 1 μm. The occurrence of a crack in the obtained cured product was not visually observed, and the refractive index was 1.70.

Example 15

The same procedure was performed as in Example 13, except that 20.0 mg of TMMP was used, to give a cured product with a film thickness of 1 µm. The occurrence of a crack in the obtained cured product was not visually observed, and the refractive index was 1.71.

Example 16

The same procedure was performed as in Example 13, except that 17.6 mg of EGMP-4 was used in place of TMMP, to give a cured product with a film thickness of 0.7 µm. The occurrence of a crack in the obtained cured product was not visually observed, and the refractive index was 1.70.

Example 17

The same procedure was performed as in Example 13, except that 17.6 mg of PEMP was used in place of TMMP, to give a cured product with a film thickness of 0.7 µm. The occurrence of a crack in the obtained cured product was not visually observed, and the refractive index was 1.71.

Comparative Example 40

The polymerizable composition obtained by mixing 1000 mg of Metal Dispersion 6 (100 mg of the metal oxide modified with the phosphorus compound) and 0.625 mg of 2-hydroxy-2-methyl-1-phenylpropane-1-one as the photopolymerization initiator was spin-coated onto a 50 mm×50 mm glass substrate at a rotation speed of 1000 rpm, heated at a temperature of 55° C. for 30 minutes, and irradiated with UV light for 20 seconds to give a cured product with a film thickness of 0.3 µm. The occurrence of a crack in the obtained cured product was not visually observed. The occurrence of a crack is considered to have been suppressed due to the thinness of the film.

Comparative Example 41

The polymerizable composition obtained by mixing 1000 mg of Metal Dispersion 6 (100 mg of the metal oxide modified with the phosphorus compound) and 0.625 mg of 2-hydroxy-2-methyl-1-phenylpropane-1-one as the photopolymerization initiator was spin-coated onto a 50 mm×50 mm glass substrate at a rotation speed of 300 rpm, heated at a temperature of 55° C. for 30 minutes, and irradiated with UV light for 20 seconds to give a cured product with a film thickness of 0.4 µm. The occurrence of a crack in the obtained cured product was visually observed.

Comparative Example 42

The same procedure was performed as in Example 13, except that 5.2 mg of TMMP was used, to give a cured product with a film thickness of 0.6 µm. The occurrence of a crack in the obtained cured product was visually observed.

When a cured product with a film thickness of 0.4 µm was obtained by curing Metal Dispersion 6 itself prepared using MR-200 in a ratio of the number of phosphorus atoms to the number of titanium atoms of 0.10 (Comparative Example 41), a crack was observed in the cured product. However, Examples 13 to 17 show that the occurrence of a crack is suppressed by the addition of the thiol even when the film is further thickened.

(Formation of Antireflection Film)

Figure 2:
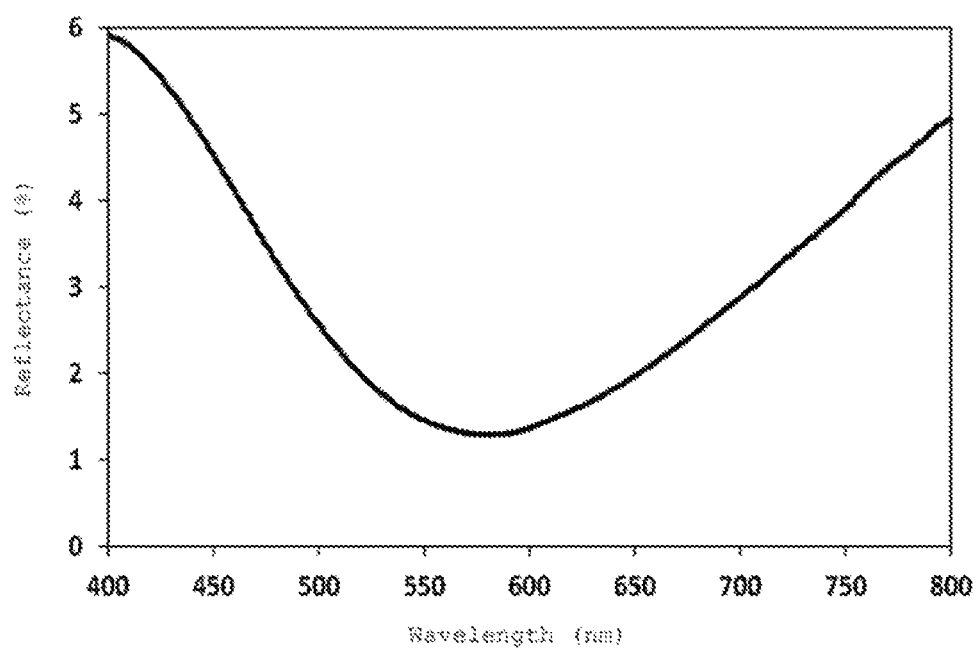
FIG. 2 shows a graph showing the measurement results of the reflectance of the antireflection film of the present invention.

A high refractive index layer was produced by the same procedure as in Example 1, except that Metal Dispersion 6 in place of Metal Dispersion 1 and a PET resin substrate with the back surface painted black in place of the glass substrate were used. Furthermore, a toluene solution of an acrylic monomer DPHA (44% by weight) was spin-coated onto the formed high refractive index layer at a rotation speed of 1500 rpm and irradiated with UV light for 15 seconds to give a low refractive index layer with a film thickness of 0.15 µm. Thus, the antireflection film was obtained. The reflectance of the obtained antireflection film was 1.5% at a wavelength of 550 nm as measured by the method as described above. The results of the measured reflectance are shown in FIG. 2.

INDUSTRIAL APPLICABILITY

The organic-inorganic hybrid polymer (particularly the acrylic polymer) prepared using the metal oxide dispersion of the present invention has not only a high refractive index but also an extremely excellent transparency and a less impaired hardness. Therefore, it is suitable for the use as optical thin films for an optical lens, an optical film, a high refractive index layer of an antireflection film, and a reflecting plate; optical materials for an optical coating, an index matching layer, an optical filter, and a heat ray cut filter; and the like.

The invention claimed is:

1. A method for producing a polymer, said method comprising:

producing a titanium oxide dispersion in the sol form comprising a phosphorus compound of Formula (1):

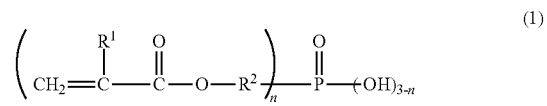

wherein $R^1$ is a hydrogen atom, an alkyl group, an alkynyl group, an alkenyl group, an aryl group, an aliphatic heterocyclic group, or an aromatic heterocyclic group; $R^2$ is an organic residue; and n is 1 or 2, by hydrolysis and condensation of a reaction mixture comprising titanium alkoxide or titanium halide and the phosphorous compound of Formula (I) in an organic solvent; and curing the titanium oxide dispersion to obtain a polymer.

2. A method for producing a titanium oxide dispersion in the sol form comprising a phosphorus compound of the following Formula (1):

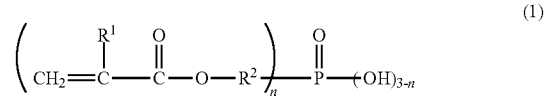

wherein $R^1$ is a hydrogen atom, an alkyl group, an alkynyl group, an alkenyl group, an aryl group, an aliphatic heterocyclic group, or an aromatic heterocyclic group; $R^2$ is an organic residue; and n is 1 or 2, said method comprising hydrolysis and condensation of a reaction mixture comprising titanium alkoxide or titanium halide and the phosphorus compound of Formula (I) in an organic solvent.

3. The method according to claim 1, wherein $R^1$ is a hydrogen atom or a linear or branched alkyl group having 1 to 5 carbon atoms.

4. The method according to claim 1, wherein $R^2$ is an organic residue of Formula (2):

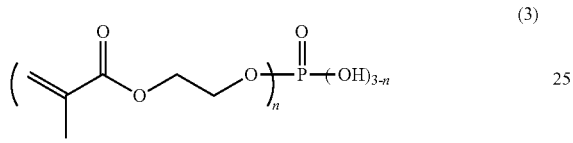
(2)

wherein Y is a linear or branched alkylene group having 1 to 10 carbon atoms; and p is an integer of 1 to 10.

5. The method according to claim 4, wherein Y in Formula (2) is a linear or branched alkylene group having 1 to 4 carbon atoms.

6. The method according to claim 1, wherein the molar ratio of the phosphorus atom in the phosphorus compound to the titanium atom in the titanium alkoxide is 0.04 to 1.00.

7. The method according to claim 1, wherein the average diameter of titanium oxide is 0.03-0.5 μm.

8. The method according to claim 1, wherein the reaction mixture for the hydrolysis and condensation comprises tetraalkoxytitanium, a compound of Formula (3):

(3)

in which n is 1 or 2, and water.

9. The method according to claim 1, wherein the titanium alkoxide and the phosphorus compound of Formula (I) are reacted under the irradiation of microwave.

* * * * *